United States Patent [19]

Jackson et al.

[11] 3,878,448

[45] Apr. 15, 1975

[54] CONTROL CIRCUIT FOR A THYRISTOR RECTIFIER

[75] Inventors: Per-Olof Jackson; Lars-Erik Juhlin; Brent Ostlund, all of Ludvika, Sweden

[73] Assignee: Allmanna Svenska Elektriska Aktiebolaget, Vasteras, Sweden

[22] Filed: June 5, 1973

[21] Appl. No.: 367,100

[30] Foreign Application Priority Data

June 21, 1972 Sweden .............................. 8150/72

[52] U.S. Cl. .............. 321/11; 307/252 A; 321/27 R

[51] Int. Cl. .............................................. H02m 1/08

[58] Field of Search ................................ 307/252 L; 321/11–14, 27 R, 5

[56] References Cited

UNITED STATES PATENTS

| | | | |
|---|---|---|---|
| 3,424,948 | 1/1969 | Ravas | 321/11 X |
| 3,536,985 | 10/1970 | Ekstrom | 321/13 |
| 3,551,778 | 12/1970 | Ekstrom | 321/5 |
| 3,654,541 | 4/1972 | Kelley, Jr. et al. | 321/13 |

*Primary Examiner*—R. N. Envall, Jr.

[57] ABSTRACT

A thyristor rectifier for high voltages includes a number of seriesconnected thyristors each of which has a control device. A control circuit for the whole rectifier includes a control pulse transmitter and a signal emitter for each thyristor which emits an indicating signal when the voltage in the conducting direction of the relevant thyristor reaches a predetermined value. The control circuit includes an input circuit to which signals for ignition of the whole thyristor rectifier are connected. The signal emitters and input circuit are connected to an AND-gate. The different signal emitters are connected to the AND-gate by an OR-gate. The OR-gate is connected to the AND-gate by a flip-flop and the output side of the AND-gate is connected to the flip-flop in such a way that a signal from the OR-gate energizes the flip-flop while a signal from the AND-gate switches it off.

6 Claims, 4 Drawing Figures

CONTROL CIRCUIT FOR A THYRISTOR RECTIFIER

BACKGROUND OF THE INVENTION

Field of the Invention

The present invention relates to a control circuit for a thyristor rectifier in a static converter for high voltage. The thyristor rectifier consists of a number of series-connected thyristors, each provided with a control device having a signal emitter which emits an indicating signal for indication of the voltage over the thyristor. The control circuit for the thyristor rectifier comprises an input circuit to receive an ignition order for the thyristor rectifier.

SUMMARY OF THE INVENTION

The object of the invention is to ensure that no ignition pulse is transmitted to the control devices of the thyristors until at least the first of the thyristors has reached a certain positive voltage in the conducting direction and that no further ignition pulses are transmitted after the last thyristor has ignited.

The first-mentioned condition is of interest during normal operation, for example, to ensure that the voltage over the individual thyristors has grown to a certain minimum value before the ignition pulse is released from the control circuit, and also to ensure that the capacitances of the control devices have been charged so that an ignition pulse really has a possibility of effecting ignition of the thyristors. Thus, the purpose of the first condition is that the ignition pulse is to be released only when the thyristors really have a possibility of igniting. The reason for the second condition is to limit the length of the ignition pulses in order to reduce the power consumption in the control circuit and the control devices and to limit the wear on the components of the circuit.

Further, the invention is of importance for protecting the thyristors in the case in which some of these are blocked, whereas others are conducting at the same time that a positive voltage occurs over the entire rectifier and the rectifier has an ignition order. This case may occur at low load current in the thyristor rectifier, and fluctuations in current or voltage may then result in the thyristors temporarily becoming currentless. Some thyristors have time to recover their blocking ability in the conducting direction, whereas others maintain their conducting state so that the positive voltage is applied across a minor number of thyristors which can then be destroyed. A similar case may arise in inverter operation after a conducting interval if the positive voltage over the rectifier has time to return before all the thyristors have regained their blocking ability in the conducting direction. In view of this, it is usual to arrange a so-called recovery protection device for the thyristors, and the control circuit according to the invention permits the connection of such a known recovery protection device.

Under the said conditions, it is assured according to the invention that the thyristors will receive an ignition pulse when this is desired, either during normal operation or as a protection measure, and that the thyristors will receive an ignition pulse only when this can result in the desired ignition.

In order to accomplish this, the thyristor rectifier, in which the thyristors are each provided with a control device, has a control circuit for the whole rectifier which includes a control pulse transmitter and a signal emitter for each thyristor which emits an indicating signal when the voltage in the conducting direction of the relevant thyristor reaches a certain value. The signal emitters and the input circuit of the control circuit are connected by an AND-gate to the control pulse transmitter, and the AND-gate is connected by an OR-gate to the different signal emitters. A flip-flop connects the OR-gate to the AND-gate, and is controlled so that it is energized by a signal from the OR-gate and switched off by a signal from the AND-gate.

The main part of the above problems were known previously and separate solutions exist to some of them. The simultaneous use of the different solutions may however become complicated and they may also conflict with each other. According to the invention, the different cases are treated together in a combined control circuit, which will facilitate matters and simultaneously make possible a coordination of the different conditions.

BRIEF DESCRIPTION OF THE DRAWINGS

In other respects the invention will be further described with reference to the accompanying drawing, in which FIG. 1 shows a thyristor rectifier having a control circuit according to the invention, whereas

DESCRIPTION OF THE PREFERRED EMBODIMENTS

Figure 1:
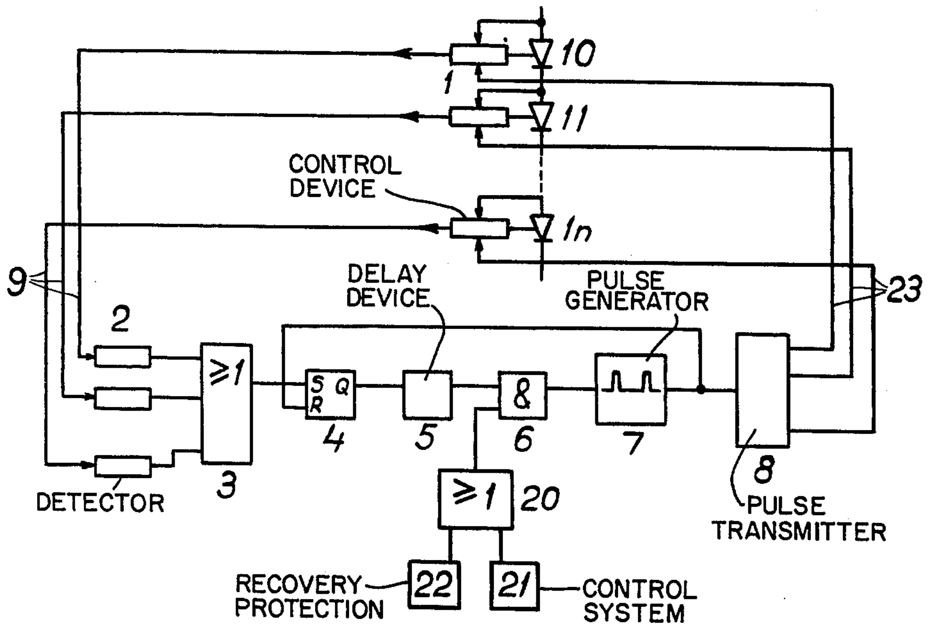

FIG. 1 shows a thyristor rectifier for high voltage with a number of series-connected thyristors 10-1n, in which each thyristor is provided with a control device 1. This control device may be designed according to patent No. 3,794,908, Feb. 26, 1974 of Georg Lindblom et al. Thus control device 1 is connected to the voltage over the corresponding thyristor and is provided with an input circuit receiving control signals from a common control device 8 and transmitting these signals to the control electrode of the thyristor. Further control device 1 is provided with an output circuit emitting signals to indicate that the voltage over the corresponding thyristor is positive and that the ignition circuit of the entire thyristor is charged so that ignition of the thyristor can be carried out.

The signals from 1 are transmitted in the form of light pulses through light conductors 9 to detectors 2 which emit electric signals to the OR-gate 3. The signal from 3 is transmitted to a flip-flop 4 which is switched on, and the signal from 4 is transmitted through a delay device 5 to the AND-gate 6. By means of said delay device 5 it is assured that the voltage over the different thyristors has time to grow to the desired value so that all the thyristors are ready to be ignited before an ignition pulse is sent off.

An OR-gate 20 is connected to a second input on the AND-gate 6, to the input side of which two devices 21 and 22 are connected. The first of these, 21, is the normal control system for the thyristor rectifier, that is for the static converter which is intended to comprise the thyristor rectifier. Such a control system can be designed, for example, according to U.S. Pat. No. 3,551,778.

The other device 22 is a so-called recovery protection device for the thyristor rectifier, as explained below in connection with FIGS. 3 and 4, that is a protection which orders a renewed ignition if all the thyristors have not regained their full blocking ability after a conducting interval, before positive voltage grows over the thyristor rectifier.

The signal from the AND-gate 6 is transmitted to a pulse generator or pulse former 7 which emits pulses to the transmitter 8 of suitable length and frequency for a safe ignition of the thyristor and the least possible wear on the components. The transmitter 8 delivers light pulses from light diodes, not shown, said light pulses being transmitted by light conductors 23 to the control devices 1 for ignition of the thyristors 10-1n.

The pulses from 7 are also transmitted to the other input on the flip-flop 4 in order to switch it off, 6, 7 and 8 then being blocked after the thyristors have ignited. If one of the thyristors fails to ignite, however, the positive voltage over these thyristors will remain, and therefore the signals from the control devices 1 over 2 and 3 will switch the flip-flop 4 on again so that a new signal occurs through 5 - 8.

As mentioned previously, the same thing will occur if the thyristor rectifier, for example at low load, expires because of fluctuations in current and voltage during a normal conducting interval. In this case the ignition order remains from 21, and, when the voltage grows again over the thyristor rectifier, the flip-flop 4 becomes energized and a new control pulse is released through 5-8.

Thus, according to the invention an ignition pulse is obtained in the same system during normal operation if the voltage over the thyristor rectifier is positive in the conducting direction, and re-ignition is obtained if the rectifier expires during a normal conducting interval. In addition to this, reignition is obtained after a conducting interval if the thyristors have no time to recover before positive voltage grows.

Figure 2:
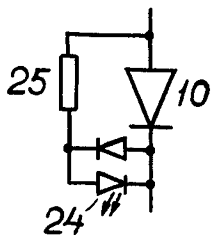
FIG. 2 shows a variant of a signal emitter in such a control circuit.

FIG. 2 shows a more simple form of signal emitter for the control devices 1, simply consisting of a light diode 24 which is connected in parallel with one of the thyristors 10-1n in series with a resistor 25. A diode connected in anti-parallel with the light diode 24 protects the diode against voltages in the blocking direction.

The operation of the recovery protection device 22 is now explained in connection with FIGS. 3 and 4. Here FIG. 4 shows device 22 in more detail, while FIG. 3 is an explanatory diagram for FIG. 4, showing the voltage over the whole rectifier in FIG. 1 before, during and after a commutation during inverter operation.

Figure 3:
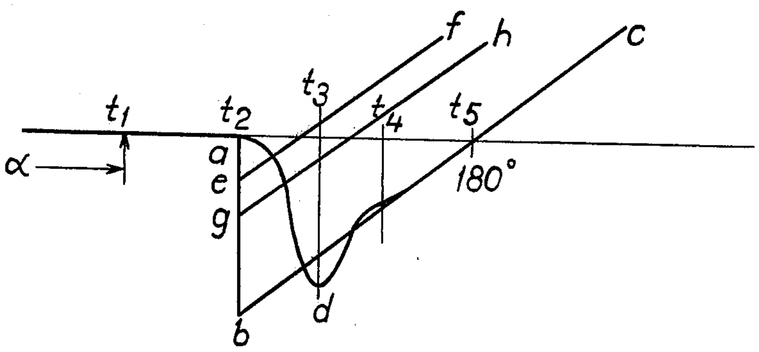
FIG. 3 is a diagram showing the voltage across one of the rectifiers of FIG. 1.

FIG. 3 shows the voltage across the rectifier 10-1n in FIG. 1 in inverter operation before, during and after the commutation. During the conducting interval of the rectifier, and also during the commutation, the voltage across the rectifier is almost zero in comparison with the voltage across the rectifier when it is blocked. When the commutation finishes, the voltage anode-cathode will become negative and will change polarity a short while afterwards to become positive. In FIG. 3 the commutation is initiated at the moment $t_1$ with a delay angle $\alpha$ which is selected so that the sum of this angle and the commutation time is less than 180° with the desired commutation margin. The control device 21 may for this purpose include a means for commutation margin control according to U.S. Pat. No. 2,774,012.

The time $t_1 - t_2$ indicates the commutation time and at the end of the commutation the voltage across the rectifier will in theory follow the curve abc, that is, it will be first negative, decrease to zero at the moment $t_5$, corresponding to the angle 180°, and then become positive. However, in practice the voltage does not drop instantaneously to its negative value but follows the curve ad since the thyristors are not blocked simultaneously or instantaneously in the inverse direction.

However, the thyristors need considerably longer time to recover their strength to withstand voltages in the forward direction since they contain a number of free charge-carriers which must first be recombined or sucked out to the blocking junctions in the thyristor. Thus, for example $t_4$ is the first point at which all the thyristors can be assumed to have recovered so that they are ready to take up voltage in the conducting direction. This must therefore be taken into consideration when calculating the necessary commutation margin, for example in accordance with U.S. Pat. No. 2,774,012.

It is clear that, if the commutation is finished at $t_2$ and the rectifier voltage follows the curves adc, everything is all right. However, if the commutation is delayed so that the curve ad is displaced to the right, the moment $t_4$ may lie to the right of $t_5$, in which case the conditions may be critical. Such a delay may be caused by a voltage drop in the AC voltage connected to the rectifier, the commutation voltage which is the driving force for the commutation decreasing, or the delay may be caused by disturbances in the DC circuit.

In FIG. 3 this has been illustrated by displacing the voltage curve bc to the left so that the voltage may be imagined to follow the curve aef or the curve agh. If the voltage follows the curve aef it will become positive after such a short time that presumably none of the thyristors will have regained their blocking ability and thus the whole thyristor-rectifier will re-ignite. A regular arc-through is thus obtained which causes a disturbance in the converter operation but such disturbances in an inverter are relatively harmless and of a temporary nature.

If, on the other hand, the voltage follows the curve agh it will have been negative for so long that some of the thyristors will have recovered whereas others will re-ignite for the growing positive voltage. This voltage will therefore only lie over the thyristors which have recovered and these will therefore probably auto-ignite which may very easily means that they are destroyed and after the next commutation there is a risk that the rest of the thyristors will be destroyed.

Figure 4:
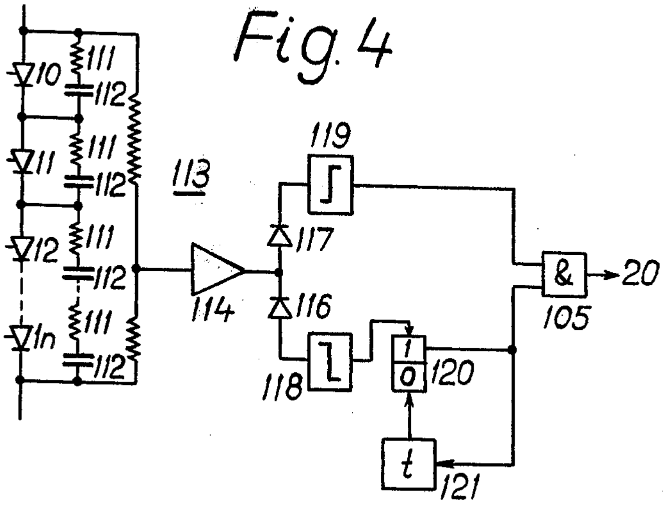
FIG. 4 shows the recovery protection device.

It can thus be seen that the critical interval for the occurrence of positive voltage is substantially just before $t_4$ and according to the invention the thyristors are protected by making a positive rectifier voltage within this interval cause controlled ignition of all thyristors, as shown in FIG. 4.

FIG. 4 shows the thyristor rectifier in FIG. 1 with the series-connected thyristors 10-1n parallel connected with a voltage-divider comprising resistors 111 and capacitors 112. The rectifier is controlled by the control system 21 in FIG. 1 through Or-gate 20. In parallel with the whole rectifier is an extra voltage-divider 113 and from this the voltage over the rectifier is taken out and influences two parallel circuits through an amplifier 114.

These two parallel circuits contain individual voltage level discriminators 118, 119, for example in the form of impulse transformers connected to the amplifier 114 through reverse parallel diodes 116, 117, respectively. In this way 118 will indicate negative voltage across the anode-cathode of the rectifier and 119 will indicate positive rectifier voltage and, by insertion of the amplifier 114, these indications are obtained at the same instant as the voltage changes polarity.

The discriminator 118 is connected to a bistable circuit 120, the output side of which is connected to an And-gate 105 and also to a time device 121 which is arranged for resetting of the bistable circuit 120. The signals from 119 and 120 are both connected to the And-gate 105, the output side of which is connected to the Or-gate 20.

Under normal conditions when the rectifier voltage follows the curve abc, or rather adc, 118 emits a signal to 120 at about the moment $t_2$, and this signal is maintained by the bistable circuit 120 until about $t_4$ when the time device 121 returns the circuit to zero position. The discriminator 119 emits a signal at the moment $t_5$, at which moment the signal from 120 has ceased and nothing happens since there is no overlap of the input signals to 105.

If, however, a disturbance causes the rectifier voltage to follow one of the curves agh or aef, the signal from 119 will arrive before the moment $t_4$, which causes overlapping of the signals to 105 which will therefore emit a signal to 20 and the rectifier ignites. In the latter case, that is, when the voltage follows the curve aef, such an ignition signal is in fact superfluous, as is clear from the above, since the rectifier will in any case arc-through. On the other hand it does no harm and furthermore increases the safety of the rectifier.

We claim:

1. Thyristor rectifier for high voltage comprising a plurality of series-connected thyristors (10-1n), each provided with a control device (1) and a control circuit for the whole rectifier, the control devices being controlled from a control pulse transmitter (8) in the control circuit and provided with a signal emitter which emits an indicating signal when the voltage in the conducting direction of the relevant thyristor reaches a certain value and the control circuit comprising an input circuit (20) to which signals for ignition of the whole thyristor rectifier are connected, in which an AND-gate (6) connects said signal emitter and said input circuit to said control pulse transmitter, and an OR-gate (3) connects the different signal emitters to the AND-gate.

2. Thyristor rectifier according to claim 1, in which a flip-flop (4) connects said OR-gate (3) to said AND-gate (6) and means is provided connecting the output side of said AND-gate to said flip-flop in such a way that a signal from the OR-gate causes the flip-flop to be energized, whereas the subsequent signal from the AND-gate switches the flip-flop off.

3. Thyristor rectifier according to claim 1, including a delay circuit (5) connecting said OR-gate (3) to said AND-gate (6).

4. Thyristor rectifier according to claim 1, including a pulse former (7) connecting said AND-gate (6) to the control pulse transmitter (8).

5. Thyristor rectifier according to claim 4, in which the pulse former includes means to emit control pulses with a given length and frequency.

6. Thyristor rectifier according to claim 1, in which said input circuit comprises an OR-gate (20), to which the normal ignition signal (21) of the thyristor rectifier, as well as the ignition signal from a recovery protection device (22) for the thyristors (10-1n) are connected.

* * * * *